Sept. 9, 1947.           R. M. BRINK           2,427,191
BLANKING CONTROL FOR RADIO BEACON SYSTEMS
Filed Oct. 25, 1944           2 Sheets-Sheet 1

INVENTOR.
Robert M. Brink
BY
Howson & Howson
Attys.

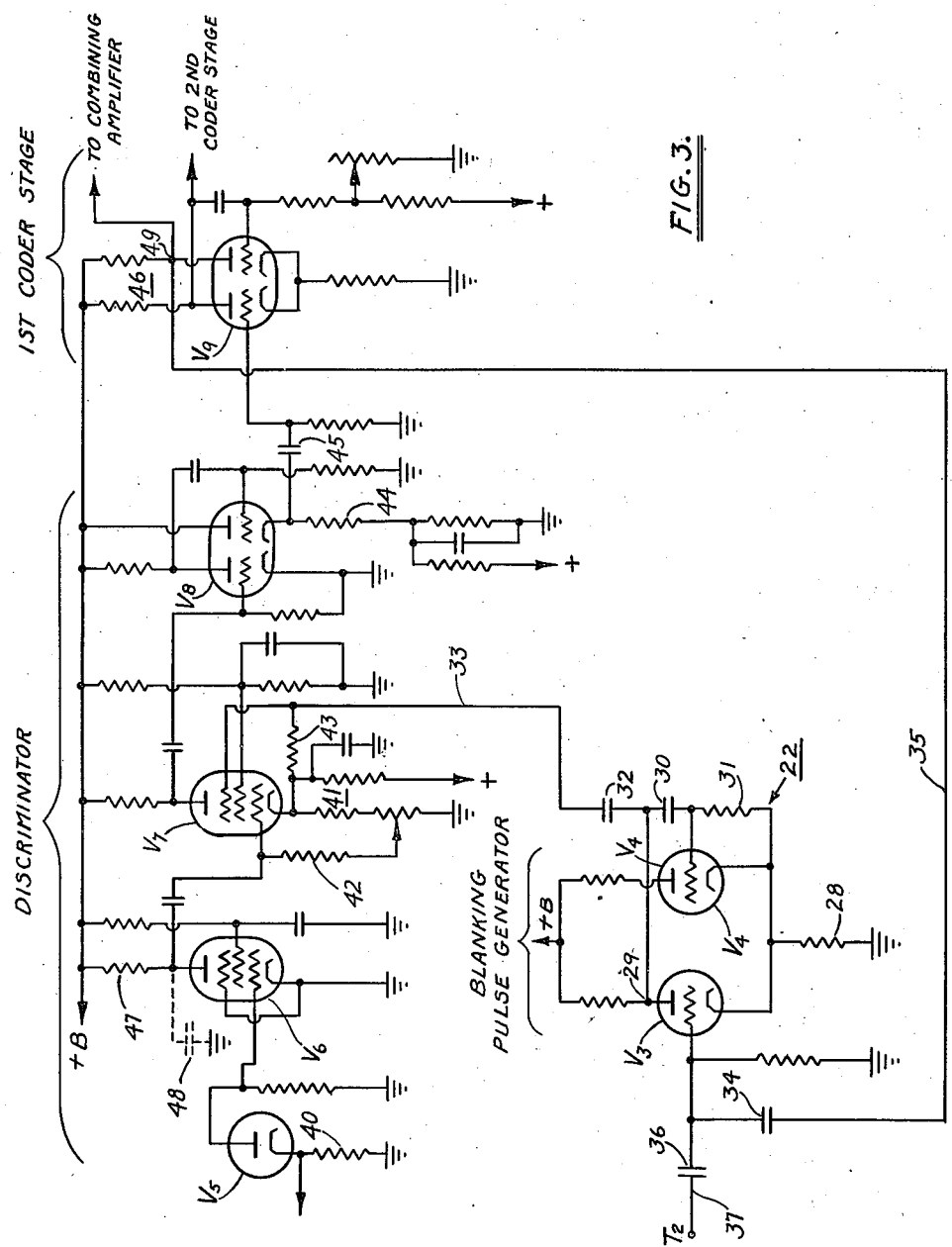

Patented Sept. 9, 1947

2,427,191

UNITED STATES PATENT OFFICE 2,427,191

BLANKING CONTROL FOR RADIO BEACON SYSTEMS

Robert M. Brink, Jenkintown, Pa., assignor, by mesne assignments, to Philco Corporation, Philadelphia, Pa., a corporation of Pennsylvania Application October 25, 1944, Serial No. 560,309

11 Claims. (Cl. 250—2.2)

1

This invention relates to signaling systems adapted to operate over a wide band of frequencies. More particularly, the invention relates to radar beacon systems and has especially to do with the prevention of spurious activations of beacon code-pulse generators—which spurious activations have been found to result from transient voltages generated within the beacon receivers, and are objectionable for the reason that they give rise to uncalled-for beacon transmitter operations which conflict with intended operations thereof and thus tend to cause confusion and even false indications at the interrogating craft as to the identity of the beacon.

Ordinarily, radar beacon systems for aircraft use or the like operate in the ultra high frequency region and at carrier frequencies which may vary over a considerable range. Especially is this true as respects the airborne transmitting equipment. For instance, an airborne transmitter designed to cooperate with a radar beacon and having a nominal assigned carrier frequency of 1080 megacycles may operate anywhere in the band extending from say, 1050 to 1110 megacycles. A radar beacon receiver forming a component part of a beacon system and designed to control the operations of the beacon transmitter must be capable of responding to all the proper interrogating signals within such a band.

The difficulties encountered in designing a conventional superheterodyne receiver having very broad radio frequency and intermediate frequency pass bands so that the entire bands of interest may be continuously received or monitored without having to resort to a tuning or band-sweeping process are, of course, well known in the art. In order to provide for substantially instantaneous response to incoming signals of any carrier frequency within such a wide reception band, there may advantageously be employed a high gain superheterodyne receiver such as that described in the co-pending United States patent application of William H. Newbold, Serial No. 516,479, filed December 31, 1943, incorporating a specially designed converter system which enables the use of a highly sensitive narrow band intermediate frequency amplifier, even though the radio frequency band be of great width as hereinabove indicated. Since this high gain wide band superheterodyne receiver is fully described in the above-mentioned application, it will suffice to say that the substantially instantaneous reception of any signal within the wide band of frequencies over which the aircraft transmitter may operate is made possible through the arrangement of the superheterodyne local oscillation generator. The latter may comprise a plurality of separate oscillators adjusted to operate at predetermined different frequencies, or it may comprise a single oscillator which may periodically be tuned automatically from one to another predetermined frequency.

Where the local oscillation generator comprises a plurality of separate oscillator units fixedly tuned to different frequencies, there obtains, by reason of their interaction one or more difference frequencies having a value or values falling within the intermediate frequency band of the beacon receiver; and, for that reason, the local oscillator units cannot be permitted to operate simultaneously but must instead be switched on and off alternately. This, preferably, is accomplished through the agency of electronic switching means rather than a mechanical switch. But irrespective of which of the two aforementioned alternative local oscillation generator arrangements may be adopted, the fact remains that recurrent switching is necessary and that, as a consequence, there may be generated short duration transient voltages having frequencies within the intermediate frequency band and thus capable of passing through the receiver and appearing at the output end thereof, just as do regularly received interrogating signal pulses.

When the duration of such a transient approaches the normal threshold of the discriminator stage of the beacon system the transmitter thereof may be activated and thus caused to send out a beacon identifying signal, notwithstanding the absence of a regular incoming interrogating signal. Such superfluous transmissions of identifying signals are, as previously indicated, highly objectionable, and it accordingly is desirable to provide some suitable preventative means.

It is the primary object of the present invention to provide a simple and effective means to prevent transient voltages generated in the receiver by oscillator switching from activating the transmitter of a radar beacon system.

Other objects and advantages of the present invention will become apparent during the course of the following description taken in conjunction with the accompanying drawings in which:

Fig. 3 is a schematic diagram of the discriminator and blanking pulse generator, together with a portion of the coder, constituting additional parts of the beacon system of Fig. 1.

Figure 1:
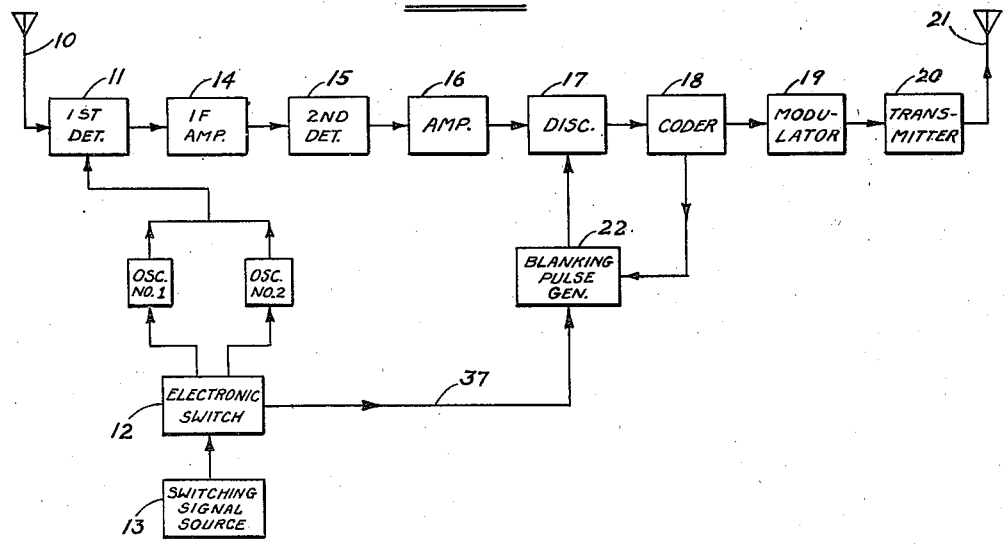
Fig. 1 is a block diagram of a radar beacon system incorporating a preferred embodiment of the invention.

Reference is now made to Fig. 1, which illustrates by means of a block diagram a radar beacon system incorporating a high gain, wide frequency band superheterodyne receiving system such as described in the previously mentioned application of William H. Newbold. Since the receiving portion of the beacon system of Fig.

1 is fully described in the Newbold application, it will suffice to mention that incoming high frequency signals picked up by antenna 10 and lying within a wide frequency range, for example, 1050 to 1110 megacycles, are applied to the receiver's wide band input circuit (included in the first detector unit 11 of Fig. 1) and converted in said detector unit into intermediate frequencies within the range of say, 7½ to 22½ megacycles—a 15 megacycle band.

The particular local oscillator system shown in Fig. 1, which will hereinafter be described with reference to Fig. 2 comprises two local oscillator units OSC1 and OSC2, an electronic switch 12, and a switching signal source 13. The signal derived from the first detector unit 11 is amplified by the I. F. amplifier 14, demodulated by the second detector 15, and again amplified by amplifier 16. The output of amplifier 16 is applied to a pulse discriminator indicated in Fig. 1 by rectangle 17. While discriminator 17 will be described hereinafter with reference to Fig. 3 it may be stated here that only pulse signals of not less than a certain predetermined width are passed on to the coder unit 18. This coder unit is fully disclosed in the co-pending patent application of Claudius T. McCoy, Serial No. 556,615, filed September 30, 1944, and assigned to the same assignee as the present application. Hence, it is deemed sufficient to point out here that said coder, upon receiving a pulse signal from discriminator 17, generates and applies a signal consisting of a predetermined series of pulses to modulator 19 of the transmitting system; which pulses modulate the output of transmitter 20, thus bringing about radiation from antenna 21 of a series of radio frequency pulses which spell out an identifying code number and are capable of being visually reproduced as such on a viewing screen carried by the interrogating aircraft.

When the beacon system has received an interrogating signal it is of course essential that no succeeding incoming signal be allowed to interfere with the transmission of the beacon identifying signal. That is to say, coder 18 must be safeguarded against further activation until it has fully completed a given cycle of operation corresponding to a complete identifying signal. Otherwise, two or more overlapping series of identifying signal pulses might be transmitted—thus rendering identification difficult if not impossible. To this end a suitable voltage generated in the coder 18 is utilized to trigger the blanking pulse generator 22 in Fig. 1, the output voltage of which is applied to discriminator 17 to prevent subsequent signals applied to the discriminator by the receiver from passing through the discriminator until emission of the previously initiated identifying signal from antenna 21 has been completed.

In order to prevent activation of the beacon transmitter by transient voltages generated in the receiver as a result of alternately switching the local oscillators on and off, the present invention proposes to utilize suitable pulses available in the receiver's local oscillator switching circuit for triggering the blanking pulse generator 22 at the outset of each switching period, thereby rendering the discriminator inoperative during the time the transients are being set up in the receiver by oscillator switching. The proposed connection to effect operation of the blanking pulse generator during oscillator switching is indicated in Fig. 1 by conductor 37, which extends from electronic switch 12 to blanking pulse generator 22. The location of a convenient source of pulse voltage available in the electronic switch 12 for triggering the blanking pulse generator will be pointed out in the following description of Fig. 2.

Figure 2:
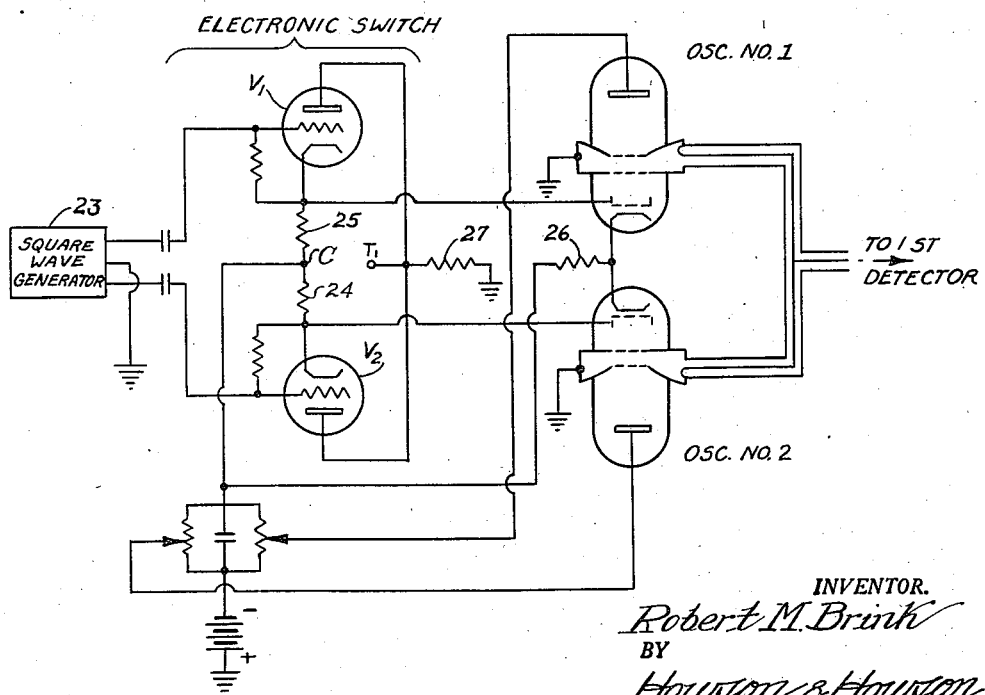
Fig. 2 is a schematic diagram of an electronic switch and local oscillators, forming a part of the beacon system of Fig. 1.

In Fig. 2 there is shown schematically the circuit employed in the system of Fig. 1 for switching the two local oscillators, OSC1 and OSC2, alternately on and off. As previously stated, the local oscillators and switching circuit of Fig. 2 is fully described in the aforementioned application of William N. Newbold, to which reference may be had, and will not be described here beyond what is necessary to convey an understanding of the general operation of the circuit and to show wherein a suitable pulse voltage is generated, which may readily be applied to the blanking pulse generator for preventing the beacon system from responding to the transient voltages set up in the receiver during oscillator switching.

In Fig. 2 there is shown the two local oscillators OSC1 and OSC2, which, for the higher frequencies generally employed in radar beacon systems, are of the "Reflex Klystron" type, and are controlled by the electronic switch comprising vacuum tubes $V_1$ and $V_2$ arranged in a cathode-loaded push-pull relation. A pair of switching signals for actuating the electronic switch may be derived from a suitable square wave generator 23, such as shown in Fig. 7 of the aforementioned Newbold application. One of the square wave voltages is applied to the grid of tube $V_1$, while the other square wave voltage, which is 180° out of phase with the first, is applied to the grid of tube $V_2$. The output of the square wave generator is such that tubes $V_1$ and $V_2$ are alternately conducting. This operation of tubes $V_1$ and $V_2$ results in the cathodes of these tubes being alternately positive with respect to the common junction point C of cathode resistors 24 and 25 and alternately at the same potential as said common junction point. Since the grid of OSC1 is directly connected to the cathode of tube $V_1$ and the grid of OSC2 is tied to the cathode of tube $V_2$, the grids of the oscillator tubes are alternately driven positive with respect to their cathodes. It will be noted that when one oscillator tube is functioning the plate current of that tube flowing through the common cathode resistor 26 is effective to bias the other oscillator to cut-off or beyond. Thus, the oscillator tubes are switched alternately on and off as their grids are alternately driven positive and negative with respect to their cathodes, in accordance with the switching signal derived from the square wave generator 23. As indicated in Fig. 2 the output of each oscillator is suitably applied to first detector 11 of the beacon system of Fig. 1.

In order to insure that one of the oscillator tubes is cut off before the other becomes operative the wave shapes of the square wave generator of Fig. 2 are so formed that for a short interval between half cycles of the switching waves both tubes $V_1$ and $V_2$ are biased at or beyond cut-off by the switching signal. It is during this short interval that there appears across the common plate load resistor 27 a voltage pulse which is positive at the plate end thereof. By suitably connecting the plate end of resistor 27 to the blanking pulse generator 22 this positive pulse may be used to trigger a blanking pulse generator and consequently render the discriminator non-responsive to any voltage appearing at the receiver output.

Referring to Fig. 3, the blanking pulse generator 22 is a non-oscillating multivibrator comprising two triodes $V_3$ and $V_4$—the former being normally biased to cut-off by the drop through resistance 28 due to the plate current which normally flows through triode $V_4$. Whenever a positive pulse of sufficient magnitude is applied to the grid of triode $V_3$ the latter becomes conductive and a resultant potential decrease occurs at junction 29, which is transmitted as a negative pulse through condenser 30 to the grid of triode $V_4$. The latter tube is thereupon cut off, thus removing the normal negative bias from the grid of triode $V_3$. Triode $V_4$ remains cut off until condenser 30 has discharged through resistor 31 to such an extent as to raise the potential of the grid of said triode to cut-off. Thereupon the flow of plate current through triode $V_4$ is resumed and the grid of triode $V_3$ is lowered to cut-off, thus instantly restoring to normal the potential at junction 29. The previously mentioned potential decrease occurring at that junction not only affects the grid of triode $V_4$ but is also transmitted by way of condenser 32 and conductor 33 to a point in the discriminator where it will cause the latter to be temporarily disabled for a predetermined period of time; which period is long enough to protect the system against any incoming signal pulses which might interfere with proper transmission of the identifying signal and against activation by transient voltages resulting from the aforementioned switching operation. The duration of the negative pulse transmitted via condenser 32 and conductor 33 depends largely upon the time constant of condenser 30 and resistor 31, since it is that time constant which determines the period of the multivibrator.

It will be noted that there are two connections to the grid of triode $V_3$. One of these includes a condenser 34 and conductor 35 which extends to a point 49 in the coder from which is obtained a positive pulse at the outset of each cycle of operation of the coder. This connection is in accordance with prior practice and it serves to isolate the coder and therefore the beacon transmitter against any possible interfering pulse which might otherwise come through, either from an aircraft seeking to interrogate the beacon or any other source. But this connection is of service only for a prescribed period following initiation of a coder operation and will not prevent activation of the coder by transient voltages resulting from the oscillator switching operation unless such transients happen to occur at a time when the discriminator is disabled by reason of a blanking pulse from the coder as previously explained.

The second connection to the grid of triode $V_3$ includes a condenser 36 and a conductor 37 which extends from terminal $T_2$ to terminal $T_1$ of the electronic switch—see Fig. 2. At the outset of each switching operation the positive pulse generated at $T_1$ is transmitted to the grid of triode $V_3$, and thereupon a negative pulse is transmitted to the discriminator via conductor 33—which negative pulse is of the same duration as the negative pulse engendered by the positive pulse from the coder received via conductor 35.

While the discriminator circuit per se does not form a part of the present invention, a general description of its operation will be given here in order to clarify more fully the effect and purpose of the blanking pulse generator. The pulse discriminator, as illustrated in Fig. 3, comprises an input diode vacuum tube $V_5$ arranged to respond only to negative pulses from the output of the beacon receiver which are impressed upon its cathode across a cathode resistor 40, the diode circuit being directly coupled to the input grid of the first of four resistance-capacitance coupled amplifier tubes arranged in cascade. The first amplifier tube $V_6$, preferably a high gain pentode, is operated at zero bias and is normally conducting, while the second amplifier tube $V_7$, a sharp cut-off pentode, is operated at a bias well beyond cut-off. The desired negative bias on tube $V_7$ is obtained by connecting the cathode of that tube to a suitable tap on the voltage divider 41 connected across a part of the anode voltage supply, and by connecting the grid of tube $V_7$ by way of grid resistor 42 to a variable tap on the voltage divider 41, which is at an appropriate negative potential with respect to the cathode.

The negative pulses from the blanking pulse generator are applied to the suppressor grid of the second amplifier tube $V_7$ for rendering the discriminator non-responsive to signals applied to the input diode $V_5$ during blanking periods, and said suppressor grid is connected to the cathode of tube $V_7$ through a high resistance 43. The third and fourth amplifier tubes may be of the triode type and together may take the form of a twin triode $V_8$.

The third amplifier tube of the discriminator circuit, which is the first section of the twin triode $V_8$, is operated at zero bias and is normally conducting, while the fourth and final amplifier tube, which is the second section of twin triode $V_8$, is arranged in a cathode follower type circuit and is biased beyond cut-off in a manner similar to the second amplifier tube $V_7$, except that the grid has a fixed negative bias due to being grounded through grid resistor 44. The output voltage of the discriminator, which takes the form of a sharp positive pulse, is obtained from the cathode of the final amplifier tube of the discriminator, and this output pulse is applied by way of coupling condenser 45 to the input grid of tube $V_9$ of the first coder stage 46—which is the first stage of coder 18 shown in Fig. 1. Since the coder is fully described in the aforementioned McCoy application, I have included in Fig. 3 only that part of the coder unit necessary to show the point of derivation of the positive pulse for triggering the blanking pulse generator simultaneously with the commencement of each cycle of operation of the coder, as previously explained. The aforementioned first coder stage 46, like each succeeding stage, is a single cycle oscillatory multivibrator with the first tube thereof normally non-conductive and the second tube normally conductive. The positive pulse output of the discriminator triggers the first stage, which results in a negative pulse being generated at the anode of the first tube and a positive pulse at the anode of the second tube. As indicated in Fig. 3 the negative pulse from the anode of the first tube of the first coder stage is differentiated and its back edge applied to the second stage of the coder unit for triggering the same while the positive pulse from the anode of the second tube of the first stage is applied to a combining amplifier tube, not shown, and also by way of conductor 35 and condenser 34 to the grid of tube $V_3$ of the blanking pulse generator to initiate blanking of the discriminator unit, as hereinbefore described.

The pulse width discrimination in the discriminator circuit is accomplished as follows: Negative pulses developed at the anode of the input diode $V_5$ of substantially the same wave shape and duration as the negative pulses applied to the cathode of said diode from the receiver, bias the first amplifier tube $V_6$ to cut-off or beyond. When amplifier tube $V_6$ is cut off the potential of its anode rises from its lower conductive potential in an exponential manner determined by the R—C combination of the plate load resistor 47 and the capacity to ground of the anode, indicated in Fig. 3 by the dotted line condenser 48. If the entire electrode capacity plus the stray capacities associated with the anode of tube $V_6$ is not sufficient to afford the required capacity to ground a physical condenser may be added. The duration or width of the input pulse to the discriminator circuit will then determine the extent to which the potential on the anode of the tube $V_6$ will rise before the end of the pulse returns the anode to its conducting potential. A pulse of a certain duration or wider will allow the potential on the anode of tube $V_6$ to rise sufficiently to overcome the negative bias on the grid of second amplifier tube $V_7$, thereby permitting the latter tube to amplify that part of the voltage on the anode of tube $V_6$ that is above the cut-off potential of tube $V_7$. The output of tube $V_7$ is applied to the grid of the third amplifier tube which, in Fig. 3, is the first section of twin triode $V_8$, where it is further amplified. The output of the third amplifier tube is applied to the grid of the second section of twin triode $V_8$. Since this second section is also biased highly negative, the output voltage of the third amplifier tube must be at least of sufficient magnitude to overcome this bias in order that an output signal may be developed at the cathode of the last amplifier tube of the discriminator circuit. Only an input pulse of at least a certain width applied to the discriminator circuit can develop a sharp positive pulse at the cathode of the fourth amplifier tube, which pulse initiates the operation of the coder and effects the attendant triggering of the blanking pulse generator, as already explained.

The duration of the normal blanking pulse is much greater than the duration of the transient set up in the receiver due to oscillator switching, but it is only a small percentage of the receiver "on" cycle. For example, the normal blanking pulse may be approximately of 250 microseconds duration, while for a 300 cycle switching signal the "on" time of each oscillator unit is about 1630 microseconds, resulting in an effective duty cycle of approximately 85% for the receiver.

In accordance with the present invention, transient voltages set up in the beacon receiver as a result of receiver oscillator switching are prevented from activating the beacon transmitting system by means of suitable pulses applied to the normal blanking pulse generator of the beacon system at the outset of each oscillator switching period. Thus, for the radar beacon system described herein the positive pulses available at the plate end of resistor 27, terminal $T_1$ in Fig. 2, are applied by direct connection to terminal $T_2$ in Fig. 3 and thence by way of conductor 37 and condenser 36 to the grid of tube $V_3$ of the blanking pulse generator, for blanking the discriminator during oscillator switching periods without interfering with the normal operation of the blanking system.

While the present invention has been illustrated and described as an adjunct of the particular radar beacon system of Fig. 1, it will be apparent to those skilled in the art that in other local oscillator and switching systems, such as those described in the aforementioned Newbold application, suitable pulses may be generated and applied to the normal blanking circuit of a radar beacon system for preventing response to transient voltages set up in the receiver as a result of oscillator switching.

While the invention has been illustrated and described with reference to radar beacon systems, it is applicable to other systems employing a wide band superheterodyne receiver of the type herein contemplated. For example, the invention could be used in a monitoring system for continuously indicating the presence, or absence of wave signals in a predetermined wave band. In the past, it has been customary to monitor very wide frequency bands by manually (or automatically) tuning a conventional receiver back and forth across the band in question, while aurally noting, or automatically recording, the presence of signals as they are encountered in the band-sweeping process. For certain types of band monitoring service, a receiver embodying the present invention offers very substantial advantages.

It is to be understood, therefore, that the present invention is capable of various applications and modifications such as may fall within the scope of the appended claims.

What is claimed is:

1. In the operation of a radar beacon system which comprises a beacon transmitter and a heterodyne detector for incoming interrogating signals, said detector including a source of local oscillations for beating with incoming carrier waves, and an automatic switching means for periodically changing the operating frequency of said source, said switching means being of such a character that voltage pulses may be derived therefrom, the method of preventing activation of said transmitter by transient voltages arising from the operations of said switching means which consists in deriving a voltage pulse from said switching means concurrently with each switching operation thereof, and impressing each such voltage pulse on a part of the system having control of the functioning thereof, thereby to disable said system for a momentary period of time long enough to prevent activation of said transmitter by the transient voltages, but not long enough to harmfully reduce the time during which the system is responsive to interrogating signals.

2. In the operation of a radar beacon system which comprises a beacon transmitter and a heterodyne detector for incoming interrogating signals, said detector including a source of local oscillations for beating with incoming carrier waves, and an automatic switching means for periodically changing the operating frequency of said source, said switching means being of such a character that voltage pulses may be derived therefrom, the method of preventing activation of said transmitter by transient voltages arising from the operation of said switching means, which consists in deriving a voltage pulse from said switching means concurrently with each switching operation thereof, utilizing each such voltage pulse to initiate the generation of a blanking pulse of predetermined duration, and impressing each said blanking pulse on a part of the system having control of the functioning thereof, thereby to disable the system for a momentary period of time long enough to prevent activation of said transmitter by the transient voltages, but not long enough to harmfully reduce the time during which the system is responsive to interrogating signals.

3. In the operation of a radar beacon system which comprises a beacon transmitter and a heterodyne detector for incoming interrogating signals, said detector including two local oscillators and automatic switching means for periodically rendering said oscillators operative, alternately, together with a discriminator arranged for activation by signals from said detector, and a blanking pulse generator coupled to said discriminator so as to control the operation thereof, the method of preventing activation of said transmitter by transient voltages arising from the operation of said switching means, which consists in deriving a voltage pulse from said switching means concurrently with each switching operation thereof, utilizing each such voltage pulse to trigger the blanking pulse generator to generate a blanking pulse of predetermined duration, and utilizing said blanking pulses to temporarily disable said discriminator.

4. The combination in a radar beacon system, of a heterodyne detector including a source of local oscillations, automatic switching means for periodically changing the operating frequency of said source, a discriminator having its input coupled to the output of said detector, said automatic switching means having a point at which occurs a voltage pulse concurrently with each switching operation, and means, responsive to each said voltage pulse, for impressing upon said discriminator a blanking pulse operative to render said discriminator temporarily inoperative, said system including a beacon transmitter arranged to be activated by triggering pulses received from the output of said discriminator.

5. The combination in a radar beacon system, of a heterodyne detector including two local oscillators tuned to different frequencies, automatic switching means for periodically rendering said local oscillators individually operative, alternately, an intermediate frequency amplifier coupled to the output of said detector, a discriminator coupled to the output of said amplifier, a coder controlled by signal pulses from said discriminator, a beacon transmitter controlled by said coder, a blanking pulse generator, and means intercoupling said automatic switching means and said pulse generator for triggering said pulse generator, one end of said intercoupling means being connected to a point in said automatic switching means at which occurs an electric pulse concurrently with each switching operation, said electric pulse being operative to trigger said pulse generator, the output of said pulse generator being connected to said discriminator at a point where it is effective to temporarily disable said discriminator.

6. The combination in a radar beacon system, of a heterodyne detector including two local oscillators tuned to different frequencies, an electronic switch for periodically rendering said local oscillators individually operative, alternately, said switch including a pair of vacuum tubes having their anodes connected to a current source through a common impedance, means for rendering said vacuum tubes momentarily non-conductive, simultaneously, during each switching operation, as a result of which there is generated a positive pulse at the anode end of said impedance at the commencement of each switching operation, an intermediate frequency amplifier coupled to the output of said detector, a discriminator coupled to the output of said amplifier, a coder controlled by signal pulses from said discriminator, a beacon transmitter controlled by said coder, a blanking pulse generator, a connection between the anode end of said impedance and said pulse generator for triggering said generator by means of the aforementioned positive pulses, and a connection between the output of said pulse generator and a point in said discriminator for effectively applying blanking pulses to said discriminator.

7. The combination in a radar beacon system, of a receiver responsive to incoming interrogating signal pulses, and a transmitter controlled by said receiver, said receiver comprising a heterodyne detector including a source of local oscillations, automatic switching means for periodically changing the operating frequency of said source, said automatic switching means having a point at which occurs a voltage pulse concurrently with each switching operation, and means, responsive to each said voltage pulse, for rendering said receiver temporarily inoperative.

8. The combination in a radar beacon system, of a receiver responsive to incoming interrogating signal pulses, and a transmitter controlled by said receiver, said receiver comprising a heterodyne detector including a source of local oscillations, automatic switching means for periodically changing the operating frequency of said source, and means responsive to each switching operation for preventing operation of said transmitter by transients generated by the switching means.

9. In combination, a signal transmission channel including a wide band superheterodyne receiver having a source of local oscillations, switching means for periodically changing the operating frequency of said source, and means controlled by said switching means for rendering said channel incapable of transmitting transients generated by the switching means.

10. In combination, a signal transmission channel including a wide band superheterodyne receiver having a plurality of local oscillators operable at different frequencies, switching means for effecting operation of said oscillators in sequence, and means controlled by said switching means for rendering said channel incapable of transmitting transients generated by the switching means.

11. In combination, a signal transmission channel including a wide band superheterodyne receiver having a source of local oscillations, switching means for periodically changing the operating frequency of said source, and means responsive to each switching operation for rendering said channel incapable of transmitting transients generated by the switching means.

ROBERT M. BRINK.

REFERENCES CITED

The following references are of record in the file of this patent:

UNITED STATES PATENTS

| Number | Name | Date |
| --- | --- | --- |
| 2,243,234 | Von Duhn | May 27, 1941 |
| 2,287,925 | White | June 30, 1942 |